United States Patent [19]

Mauchan

[11] Patent Number: 4,884,088
[45] Date of Patent: Nov. 28, 1989

[54] KIT FOR CONVERTING 35 MM CAMERA FOR USE WITH SELF-DEVELOPING TRANSPARENCY FILM

[75] Inventor: Donald E. Mauchan, Marlboro, Mass.

[73] Assignee: Polaroid Corporation, Cambridge, Mass.

[21] Appl. No.: 274,504

[22] Filed: Nov. 21, 1988

[51] Int. Cl.⁴ .................................... G03B 17/50
[52] U.S. Cl. .................... 354/86; 354/288; 354/210
[58] Field of Search .............. 354/210, 83, 84, 85, 354/86, 288, 304

[56] References Cited

U.S. PATENT DOCUMENTS

| | | | |
|---|---|---|---|
| 2,616,805 | 11/1952 | Land | 354/178 |
| 3,369,470 | 2/1968 | Downey | 354/86 |
| 3,421,423 | 1/1969 | Downey et al. | 354/86 |
| 3,537,376 | 11/1970 | Fleming | 354/277 |
| 3,561,340 | 9/1971 | Erlichman | 354/86 |
| 3,682,637 | 8/1972 | Land | 430/210 |
| 3,745,904 | 7/1973 | Bing et al. | 354/304 |
| 3,974,510 | 8/1976 | Ivester | 354/86 |
| 4,172,647 | 10/1979 | Gold | 354/86 |
| 4,299,471 | 11/1981 | Alex et al. | 354/304 |
| 4,756,966 | 7/1988 | Kinsman et al. | 430/497 |

*Primary Examiner*—L. T. Hix
*Assistant Examiner*—Brian W. Brown
*Attorney, Agent, or Firm*—Alfred E. Corrigan

[57] ABSTRACT

A kit for converting a conventional 35 mm camera for use with instant or self-developing transparency film assemblages. The kit includes a camera loading door defining a lighttight film withdrawal slot, and a spread roller assembly. The spread roller assembly has a generally cylindrical external configuration which approximates that of a standard 35 mm film cassette. The spread roller assembly cooperates with a film cassette supply chamber in the camera for properly orientating the spread roller assembly relative thereto and to the self-developing film assemblage.

6 Claims, 3 Drawing Sheets

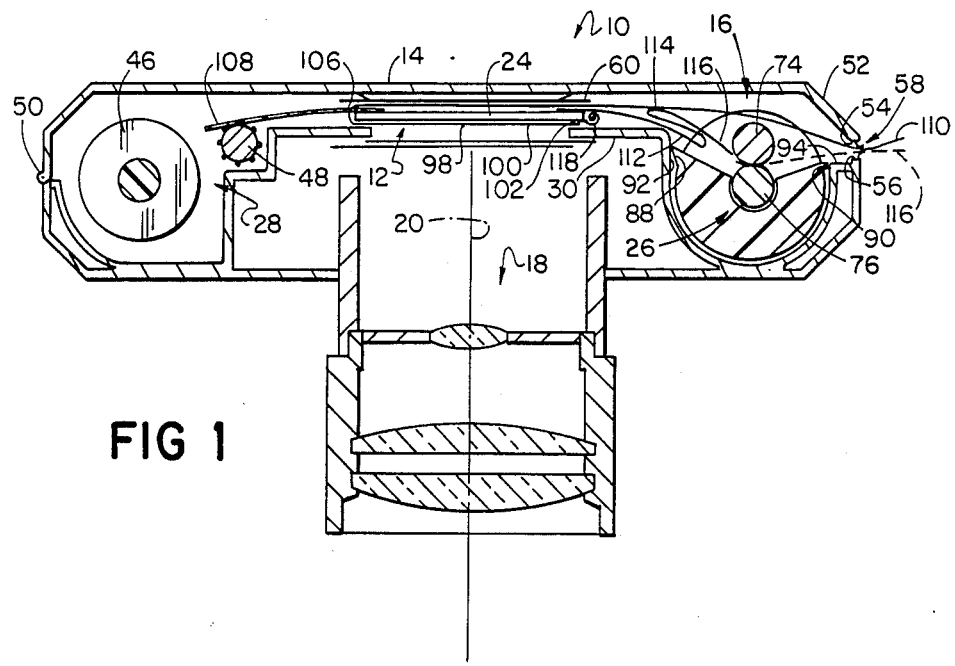
FIG 1
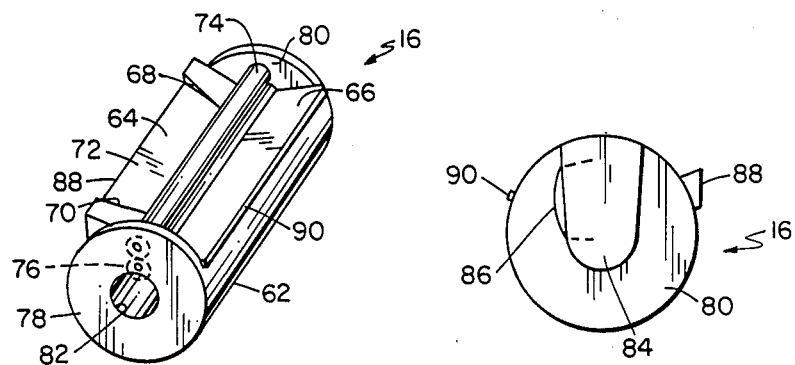
FIG 2
FIG 3

KIT FOR CONVERTING 35 MM CAMERA FOR USE WITH SELF-DEVELOPING TRANSPARENCY FILM

RELATED APPLICATION

This application is related to copending Application No. 274,400, filed Nov. 21, 1988, F. D. Mauchan et al., entitled 35 mm Self-Developing Transparency Film Assemblage.

BACKGROUND OF THE INVENTION

1. Field of the Invention

The present invention relates to a kit for converting a conventional 35 mm camera for use with self-developing film assemblages.

2. Description of the Prior Art

Heretofore, it has been known to convert standard or conventional 35 mm cameras for use with instant or self-developing transparency film assemblages. For example, U.S. Pat. No. 4,172,647, granted to N. Gold on Oct. 30, 1979 discloses a camera back having a pair of spread rollers and an expansible lighttight chamber for receiving a self-developing transparency film as it emerges from the bite of the spread rollers. The camera back is shown connected to a conventional 35 mm camera, such as a Minox 35EL. However, as can be readily appreciated from a study of FIG. 1 of the '647 patent, the substituted camera back is relatively large due in part to the fact that it must have 1) a chamber for initially receiving a film cassette containing a stack of film units, 2) the aforementioned spread rollers and expansible lighttight chamber, and 3) apparatus for advancing an exposed film unit into the bite of the spread rollers while simultaneously driving the latter in order to process the film unit. Thus, it (the substituted camera back) takes up valuable space in a photographer's accessory bag when the camera is being used with conventional film.

U.S. Pat. No. 4,299,471 shows a camera back for converting a conventional large format view camera for use with self-developing film. Again, the size of the substitute camera back must be large enough to accommodate a removable spread roller assembly rather than having such removable spread roller assembly incorporated or mounted in the camera body itself, as taught by U.S. Pat. Nos. 3,421,423, 3,561,340, 3,745,904 and 3,974,510.

SUMMARY OF THE INVENTION

The present invention relates to a kit for converting a conventional 35 mm camera for use with individual instant or self-developing transparency film assemblages.

The kit includes a film loading door, which is adapted to be substituted for the film loading door of a conventional 35 mm camera, and a spread roller assembly having an external configuration similar to that of a conventional cylindrical 35 mm transparency film cassette or canister.

One end of the film loading door is provided with a hinge for pivotally coupling the door to the back of a conventional 35 mm camera, i.e., a camera which is specifically constructed for use with conventional black and white or color 35 mm film. An opposite end of the film loading door is formed with a door latch and means which is adapted to cooperate with an adjacent surface of the camera to define a lighttight egress or slot which is dimensioned to permit the passage therethrough of a self-developing film unit especially constructed for use with the kit.

The spread roller assembly includes a pair of pregapped elongate spread rollers between which an exposed film unit is adapted to be manually advanced, and a tapered passageway or pathway for facilitating the entry of the exposed film unit between the rollers.

The spread roller assembly is constructed so as to be readily inserted into and maintained in its operative position within a supply chamber of the camera without the use of attachments such as screws, bolts, etc. Further, the spread roller assembly is provided with means which 1) permit such insertion only when the assembly occupies a predetermined spacial relationship with the supply chamber and 2) stabilize the assembly against movement once located in its operative position.

As stated above, the kit is especially adapted for use with a self-developing or instant film assemblage of the type which presents to the user a fully developed 35 mm positive transparency which is ready for subsequent mounting. The film assemblage includes a film chip which preferably is comprised of a laminate including image-recording and image-receiving layers and an opaque layer which functions as a spreading sheet. During an exposure, image bearing light is adapted to pass through the image-receiving layer before striking the image-recording layer. A stripping layer is located between the image-receiving layer and the image-recording layer for facilitating the removal of the image-receiving layer from the underlying layers of the film chip, as will be more clearly explained later. Attached to one end of the laminate is a pod of processing liquid having a rupturable side located in liquid communication with a space between the image-recording layer and the opaque spreader sheet. For more details of the film chip as described so far reference may be had to U.S. Pat. No. 3,682,637.

The film chip is substantially enclosed within an opaque sheet of flexible material, e.g. paper, which is hereinafter described as a "first leader". This first leader has one end detachably connected to a surface of a mask which is secured to a face of the film chip so as to define the area of the scene to be produced in the image-receiving layer. From this attachment point, the first leader extends rearwardly toward a trailing end of the film chip where it is rerouted around such end and directed forwardly, past a leading end of the film chip, to a position where it terminates in a manually actuatable tab. During such rerouting, the first leader passes through a slot in a rearwardly extending tab whose function is to prevent movement of the chip in a direction towards the spread roller assembly during manual actuation of the first leader. Also attached to the mask at a point closely adjacent to the leading end of the film chip is a sheet of resilient opaque material which may be folded accordion style or may be coiled. Finally, a second leader has one end secured to the spreader sheet at a location closely adjacent to the film unit's leading end, a second opposite end which is adapted to be moved to the exterior of the camera after being guided through the gap between the rollers, and an intermediate portion which is detachably connected to an intermediate portion of the first leader.

The above-described film assemblages are adapted to be located, one at a time, in a camera after its conversion for use with such assemblages. During the positioning of the film assemblage in the camera, the rearwardly extending tab, which has a plurality of sprocket holes therein, is attached to the film take-up mechanism of the camera, the film chip in the camera's focal plane, and with the free-end of the first leader routed over or behind the spread roller assembly such that its manually actuatable tab extends to a location outside of the camera. The camera back is then closed and latched thereby trapping the manually actuatable tab between the adjacent surfaces of the camera and the terminal or free end of the loading door, which surfaces now define a light-tight egress through which the film chip is adapted to be moved. The manually actuatable tab which defines the free end of the first leader is then pulled thereby detaching its opposite end from the mask on the film chip. As the first leader is completely withdrawn from the camera via the aforementioned egress, the lens facing surface of the film chip is uncovered in preparation for an exposure. Also, as the first leader is being completely withdrawn, the free end of the second leader is moved to a position between the rollers and then through the egress before it becomes detached from the intermediate portion of the first leader. During such movement of the second leader to the exterior of the camera, the rearwardly extending tab, because of its coupling to the camera's take-up spool, maintains the film chip in its exposure position.

After the film chip has been exposed, the protruding end of the second leader is manually pulled with a force sufficient to detach the rearwardly extending tab from the take-up reel. The film chip is then drawn toward the bite of the rollers until the sheet of coiled opaque material is located in engagement with one of the spread rollers. Further pulling on the second leader moves the film chip into and through the bite of the rollers while the coil of opaque material is simultaneously uncoiled due to its engagement with the spread roller and moved into lighttight engagement with the lens facing surface of the film clip. The rollers rupture the pod of processing liquid and spread its contents between the image-recording layer and the opaque layer (spreading sheet) to initiate the formation of a visible image within the image-receiving layer. As the film chip is moved to the exterior of the camera via the egress, its image-recording layer is protected against any adverse exposure by the ambient light because it is completely sandwiched within an opaque envelope defined by the uncoiled opaque sheet (held in place by any suitable adhesive) and the opaque layer (spreading sheet).

The processing liquid is allowed to imbibe the layers of the film chip for a predetermined period of time, e.g., one minute, until an image has been substantially formed in the image-receiving layer. At this time the free end of the second leader is used to strip a laminate including the opaque layer, the image-recording layer, and the stripping layer from the image-receiving layer. The uncoiled opaque sheet is also removed at this time and the film chip is now ready for mounting in a suitable frame.

An object of the invention is to provide a kit for converting a conventional 35 mm camera for use with instant or self-developing film assemblages.

Another object of the invention is to provide a kit of the type mentioned with a spread roller assembly which is constructed to be located within a conventional 35 mm camera and maintained therein without the use of fasteners.

Still another object of the invention is to construct the spread roller assembly of such a conversion kit so that it can only be located within a film supply well of a 35 mm camera in one orientation.

Other objects of the invention will in part be obvious and will in part appear hereinafter. The invention accordingly comprises the construction, combination of elements and arrangement of parts which are exemplified in the following detailed disclosure, and the scope of the application of which will be indicated in the claims.

For a fuller understanding of the nature and object of the invention, reference should be had to the following detailed description taken in connection with the accompanying drawings wherein:

FIG. 1 is a plan elevational view, in cross-section, of a conventional 35 mm camera which has been converted for use with instant or self-developing film assemblages;

FIG. 2 is a perspective view of a spread roller assembly which comprises one member of a conversion kit;

FIG. 3 is an end elevational view of the spread roller assembly shown in FIG. 2;

DETAILED DESCRIPTION OF THE INVENTION

Figure 4:
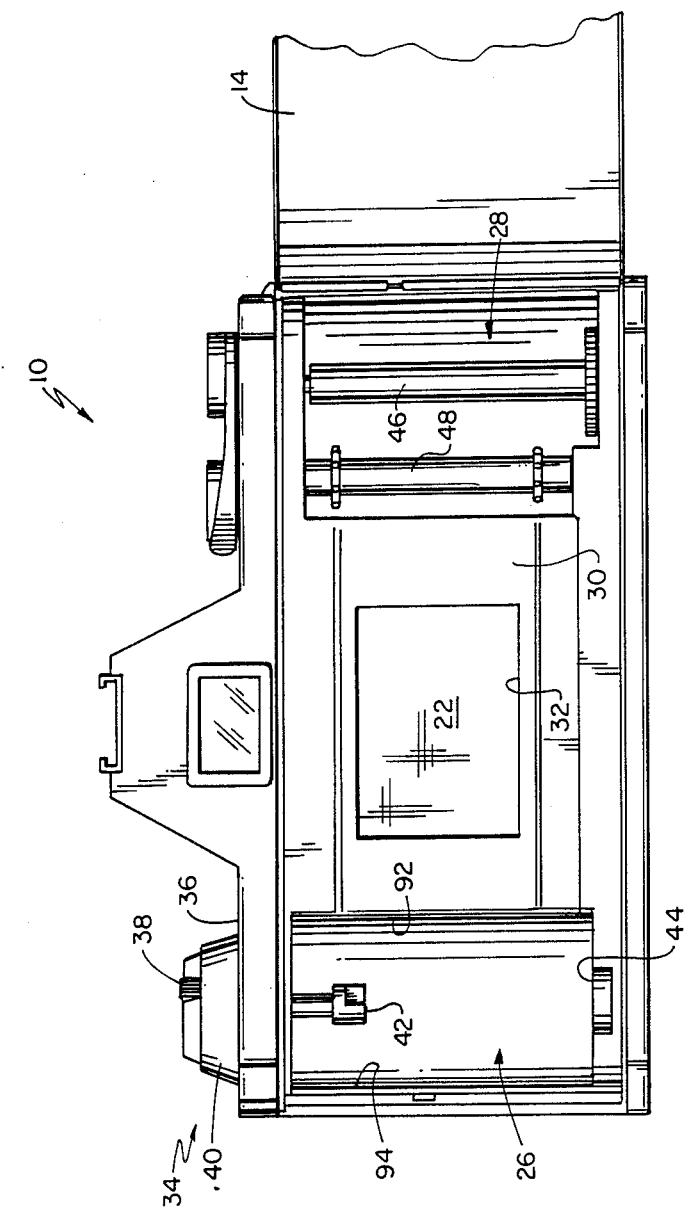
FIG. 4 is a rear elevational view of a conventional 35 mm camera with its film loading door in an open or film loading position.
Figure 5:
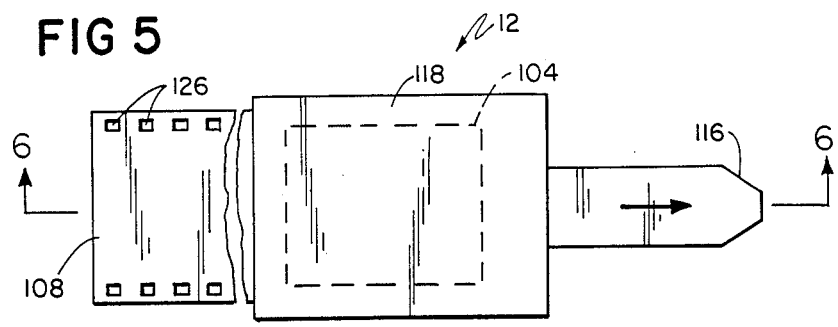
FIG. 5 is a top plan view of a film assemblage (without its first leader) as it appears during the formation of a visible image therein while located outside of the camera.

Reference is now made to the drawings, and in particular to FIGS. 1-6 wherein is shown a conventional 35 mm camera 10 which has been converted for use with instant or self-developing film assemblages 12 by means of a kit which includes a substitute film loading door 14 and a spread roller assembly 16.

As is well known, the camera 10 includes a lens assembly 18 for directing image-bearing light rays along an optical path 20 to a focal plane 22 (see FIG. 4) at which a 35 mm section of film or film chip 24 forming a portion of the film assemblage 12 is adapted to be supported for its exposure. As best seen in FIG. 4, the rear of the camera includes a film cassette supply chamber 26, a film take-up chamber 28, and a flat surface 30 interconnecting the two chambers 26 and 28. The surface 30 has an exposure aperture 32 therein which defines the focal plane 22.

A rotatably mounted film rewinding member 34 extends through a top wall 36 of the camera 10 and into the chamber 26. The member 34 includes a manually actuatable crank 38, which is shown in a folded position within a housing 40, and a drive end 42 which is adapted to extend into a hollow spool of a conventional 35 mm film assemblage so as to rotate the spool during rewinding of a length of film into its film cassette. Located in a bottom wall of the supply chamber 26 is an open ended tapered recess 44 having a generally U-shaped configuration when viewed from above. The film take-up chamber 28 is provided with 1) a rotatably mounted reel 46 to which a free end or leader of a strip of film is attached, and 2) a rotatably mounted sprocket wheel 48.

The substitute loading door 14 is pivotally coupled at one end thereof to a rear surface of the camera by a hinge pin 50. An opposite end 52 of the door 14 has a recess 54 formed in its terminal edge. This recess 54 cooperates with an adjacent surface 56 of the camera to define an egress 58 through which portions of the film assemblage 12 may be moved to the exterior of the camera 10. Suitable means, such as flocking, are mounted in the recess 56 so as to render the egress 58 lighttight. A resiliently mounted platen 60 may be provided on an interior surface of the loading door 14 for gently urging the film chip 24 into the focal plane 22. Suitable latch means (not shown) are mounted on the end 52 of the loading door 14 for securing the latter in its closed position.

The spread roller assembly 16, best shown in FIGS. 2 and 3, includes a housing 62 having a generally cylindrical configuration which approximates that of a conventional 35 mm film cassette, such as that shown in U.S. Pat. No. 3,537,376. The housing 62 includes a recess defined by first and second downwardly converging ramps 64 and 66. The ramp 64 includes a pair of inwardly slanted guide surfaces 68 and 70 which function to define a pathway 72 for guiding the free end of a second leader into the bit of a pair of superposed elongate spread rollers 74 and 76. The rollers 74 and 76 are rotatably supported by a pair of end walls 78 and 80 such that they have a predetermined spacing therebetween for facilitating the entry of the second leader therebetween. The end wall 78 includes a cylindrical recess 82 and the opposite end wall 80 includes a tapered projection 84 from one side of which extends a portion of a curved spring 86. The pathway 72 starts as an extension 88 while the surface 66 ends as a lip 90.

The spread roller assembly 16 is adapted to be readily inserted into the similarly configured film supply chamber 26 by lifting upwardly on the handle 38 of the film rewinding member 34 until the drive end 42 (which is biased downwardly into the position shown in FIG. 4) is moved upwardly to a position wherein the tapered protrusion 84 will enter the wide open end of the U-shaped recess 44 as the spread roller assembly is dropped into place in the chamber 26. The spring 86 insures a snug fit between the walls of the recess 44 and the protrusion 84. After the protrusion 84 has been fully received by the recess 44, the handle 38 is allowed to move downwardly thereby causing the end 42 to enter the recess 82 in th end wall 78 of the spread roller assembly. Note, because of the taper of both the recess 44 and the projection 84, the spread roller 16 cannot be inserted into the film supply chamber 26 in an upside down manner (rotated 180 degrees about its longitudinal axis) because the wide portion of the tapered protrusion 84 will quickly engage the walls in the narrowing recess 44 before reaching the end of the recess 44. Furthermore, the spread roller assembly 16 cannot be inserted into the chamber 26 in an inverted orientation because the length of the assembly 16 is greater than the distance between the bottom wall of the chamber 26 and the highest point that the drive end 42 can attain. Also, once received within the film supply chamber 26, rotational movement of the spread roller assembly 16 is prevented by the extension 88 being located in engagement with a wall 92 of the chamber 26 and the lip 90 being in engagement with an edge 94 of the film supply chamber 26.

The film assemblage 12 includes a first opaque leader 98 which substantially encloses the film chip 24 to protect it from premature exposure during its loading into the camera 10. One end 100 of the first leader 98 is detachably connected at 102 to a portion of a mask 104 (see FIG. 6). The mask 104 extends around four sides of the film chip 24 and functions to define the area thereof to be photographically exposed.

As best seen in FIG. 1, the first leader 98 extends across the exposure face of the film chip 24 and is then rerouted upwardly, through a slot 106 in a rearwardly extending tab 108 secured to a rearwardly facing surface of the chip 24 and then to the right under the platen 60, over the spread roller 74, and then to the exterior of the camera 10 via the egress 58 whereat it terminates in a manually actuatable tab 110.

The film assemblage 12 further includes a second leader 112 having one end secured to the rearwardly facing surface of the chip 24, an intermediate portion detachably secured to an intermediate portion of the first leader 98 at 114, and an opposite end which terminates in a manually actuatable tab 116.

A blind or shade constructed from a coiled sheet of resilient opaque material 118 has one of its ends detachably secured to a portion of the mask 104 at a location closely adjacent to the leading end of the film chip 24 (the right hand end as viewed in FIG. 1). The sheet 118 is adapted to be supported in the same plane as the film chip 24 by the surface 30.

Figure 6:
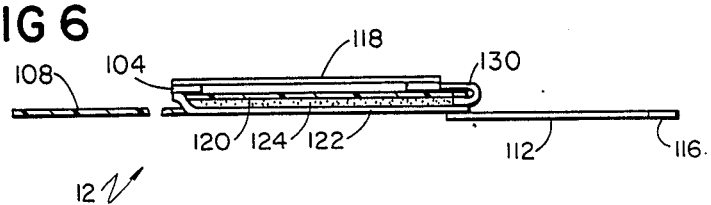
FIG. 6 is a cross-sectional view of the film assemblage of FIG. 5 taken generally along the line 6—6.

The film chip 24, see FIG. 6, basically comprises a series of layers including first and second sheets 120 and 122 between which a processing liquid 124 is adapted to be spread. The sheet 120 includes a plurality of layers supported on a transparent support through which an exposure is to be made. These layers include, in the order of their proximity to the transparent support, a color screen, an image-receiving layer, a stripping layer, and an image-recording layer. The sheet 122 is opaque and functions to facilitate the spreading of the processing liquid 124 across the image-recording layer while simultaneously protecting one side of the image-recording layer from the ambient light as it is moved to the exterior of the camera 10.

After the film assemblage has been properly positioned within the camera 10, as shown in FIG. 1, with the tab end 110 of the first leader 98 located exteriorly of the camera 10, and with the tab 108 detachably secured to the sprocket wheel 48 via sprocket holes 126, the tab 110 is manually pulled so as to remove it from the camera 10. During such pulling, the connection 102 to the mask 104 is broken and the second leader 112 is gradually unfolded as its tab end 116 moves toward the bite between the spread rollers 74 and 76. Because the second leader 112 is made from a stiffer material than is the first leader 98 and because of the location of the detachable connection 114 therebetween, the tab end 116 has a tendency to continue its movement toward the bite of the rollers 74 and 76 as the first leader 98 is routed over the roller 74. When all of the slack has been removed from the second leader, its tab end 116 will have been moved to the broken line position shown in FIG. 1. Further withdrawal of the first leader 98 now results in the uncoupling of the two leaders at the point 114.

Once the first leader 98 has been removed from the camera 10, the film chip 24 is photographically exposed and then the tab end 116 of the second leader is manually actuated or pulled so as to cause the film chip 24 to move into the bite of the rollers 74 and 76. Initial movement of the film chip 24 results in clockwise rotation of the sprocket wheel 48 thus enabling uncoupling of the tab 106 therefrom. Also, as the coiled sheet 118 is moved to a position over the chamber 26 whereat it is no longer supported by the surface 30, the coiled sheet 118 "hangs downwardly" from the film chip 24 such that the attached end of the sheet 118 assumes a 90 degree angle with respect to the face of the film chip 24. This 90 degree clockwise rotation of the coiled sheet 118 may be a result of the resiliency of the sheet causing it to assume such a nonsupported orientation. As the film chip 24 enters the bite of the roller 74 and 76, the coiled sheet 118 of opaque material engages the roller 76. Continued movement of the film chip 24 now results in the rollers 74 and 76 rupturing a container 130 of processing liquid and spreading its contents between the sheets 120 and 122 so as to initiate the formation of a visible image in the image-receiving sheet while simultaneously the roller 76 causes an unwinding or uncoiling of the sheet 118 and moving it into face-to-face contact with the mask 104 where it is releasably secured thereto by a suitable pressure-activated adhesive located on the borders of the sheet 118. Thus, as the film chip 24 is pulled out of the camera via the egress 58, its imaging-recording layer (photosensitive layer) is protected from the ambient light by the opaque spreading sheet 122 on one side and the opaque sheet 118 on the opposite side. After a predetermined period of time, e.g., one minute, the tab 116 may be used to strip the image-receiving layer with the attached mask 104 and the opaque sheet 118 from the remainder of the film chip 24, as previously explained. The sheet 118 may then be removed from the image-receiving layer and the latter placed in a mount for subsequent viewing.

Figure 7:
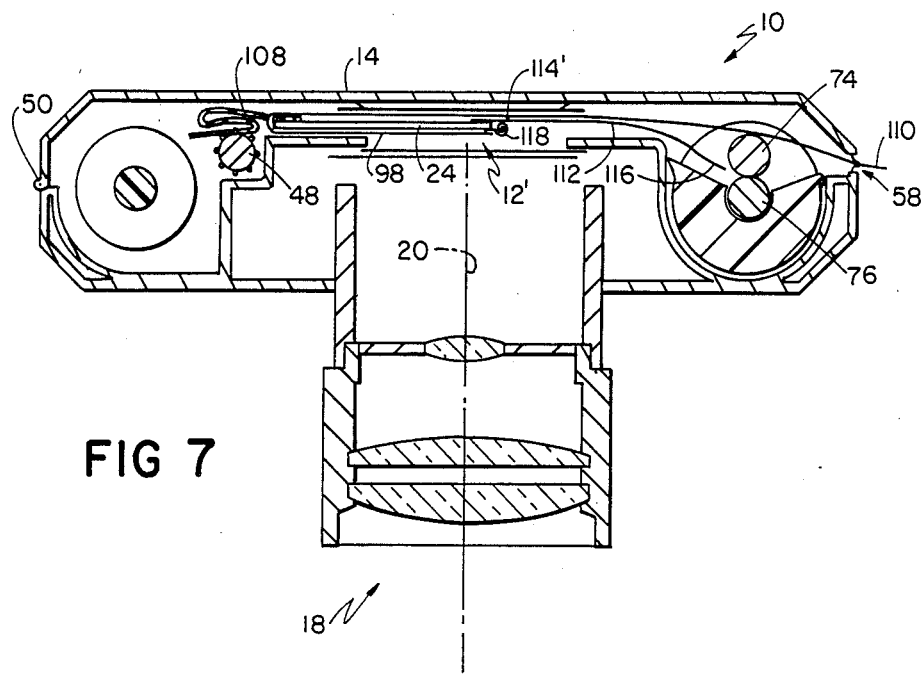
FIG. 7 is a plan elevational view of a conventional 35 mm camera, similar to the one shown in FIG. 1, showing an alternative embodiment of a film assemblage.

Reference is now made to FIG. 7 wherein is shown an alternative embodiment of a self-developing or instant film assemblage for use with the camera 10. In this embodiment, the film assemblage, designated 12′, is the same as the assemblage 12 except that 1) the slack has been taken out of the second leader 112 such that its tab end 116 is initially located adjacent to the bite of the spread rollers 74 and 76, 2) the tab 108 now has folds (slack) in it, and 3) the film chip is initially misaligned with the optical path or axis 20. Thus constructed, manual removal of the first leader 98 from the camera 10 via the lighttight egress 58 results in the tab end 116 of the second leader 112 immediately passing between the rollers 74 and 76 and then through the egress 58 as the slack is completely removed from the rearwardly extending tab 108. At this point, the film chip has been moved into proper alignment with the optical path 20 and the connection 114′ between the two leaders 98 and 112 is broken because its strength is less than the force required to separate the tab 108 from the sprocket wheel 48. The film chip 24 may now be exposed and processed in the same manner as described above with reference to the film assemblage 12.

Since certain changes may be made in the above-described invention without departing from the scope thereof, it is intended that all matter contained in the above description or shown in the accompanying drawings shall be interpreted as illustrative and not in a limiting sense.

What is claimed is:

1. A kit for converting a conventional 35 mm camera for use with self-developing film, said kit comprising:
   a substitute film loading door for replacing the film loading door of the conventional camera, said substitute film loading door having means cooperable with a camera surface for defining an egress through which a self-developing film unit is adapted to be advanced subsequent to its photographic exposure; and
   a spread roller assembly, said assembly including a housing having a generally cylindrical configuration approximating that of a conventional 35 mm film cassette and being readily received within a film cassette supply chamber in the camera, a pair of elongate rollers rotatably supported in superposition by said housing so as to define a gap therebetween, and locating means on said housing, said locating means being constructed to be received by a recess in a wall of the film cassette supply chamber for insuring the proper positioning of the spread roller assembly within the film cassette supply chamber.

2. A kit as defined in claim 1 wherein said housing includes means defining a tapered pathway leading to said gap between said elongate rollers for guiding a leader of the film assemblage into said gap.

3. A kit as defined in claim 1 wherein said locating means comprises a protrusion on an end wall of said housing.

4. A kit as defined in claim 3 further including a spring attached to said protrusion for frictionally engaging a wall of the recess in the film cassette supply chamber so as to increase sliding engagement between said protrusion and the walls of the recess.

5. A kit as defined in claim 1 wherein said housing includes longitudinally spaced first and second end walls for rotatably supporting said elongate rollers, said locating means being located on said first end wall and said second end wall including a recess for receiving a portion of an end of a film rewinding member located in the film cassette supply chamber.

6. A kit as defined in claim 1 wherein said housing includes means for preventing rotational movement of said spread roller assembly within the film cassette supply chamber of the camera.

* * * * *